United States Patent
Sahu

(10) Patent No.: US 7,888,923 B2
(45) Date of Patent: Feb. 15, 2011

(54) DYNAMIC PHASE MANAGER FOR MULTI-PHASE SWITCHING REGULATORS

(75) Inventor: Biranchinath Sahu, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 131 days.

(21) Appl. No.: 12/413,091

(22) Filed: Mar. 27, 2009

(65) Prior Publication Data
US 2010/0246221 A1 Sep. 30, 2010

(51) Int. Cl.
G05F 1/00 (2006.01)
(52) U.S. Cl. ............... 323/283; 323/284; 323/285
(58) Field of Classification Search .......... 323/220, 323/222, 223, 271, 282, 283, 284, 285
See application file for complete search history.

(56) References Cited

U.S. PATENT DOCUMENTS

| | | | | |
|---|---|---|---|---|
| 5,943,227 A * | 8/1999 | Bryson et al. | ............... | 363/95 |
| 5,963,441 A | 10/1999 | Gibbs et al. | | |
| 6,965,502 B2 | 11/2005 | Duffy et al. | | |
| 7,570,036 B2 * | 8/2009 | Tang et al. | ............... | 323/283 |
| 7,580,805 B2 * | 8/2009 | Tabaian et al. | ............... | 702/106 |
| 7,772,811 B1 * | 8/2010 | Jain et al. | ............... | 323/224 |
| 2002/0171985 A1 | 11/2002 | Duffy et al. | | |
| 2007/0139973 A1 | 6/2007 | Leung | | |

* cited by examiner

Primary Examiner—Bao Q Vu
Assistant Examiner—Nguyen Tran
(74) Attorney, Agent, or Firm—John J. Patti; Wade J. Brady, III; Frederick J. Telecky, Jr.

(57) ABSTRACT

An apparatus is provided. The apparatus comprises a current sensor, an error amplifier, a comparator, an analog-to-digital converter (ADC), control logic, and drivers. The error amplifier is adapted to receive a reference voltage and a feedback voltage, and the comparator has a first input terminal and a second input terminal, where the sum of at least a first portion of a common mode voltage and an output of the error amplifier is input into the first input terminal, and wherein the sum of at least a second portion of the common mode voltage and an output of the current sensor is input into the second input terminal. The ADC receives the sum of the second portion of the common mode voltage and the output of the current senor. Additionally, the ADC has a plurality of internal threshold voltages that are between the common mode voltage and an overcurrent limit adjustment voltage. The control logic receives an output from the comparator and the ADC, and the drivers are each adapted to receive at least one control signal from the control logic so as to provide drive signals to a converter.

13 Claims, 2 Drawing Sheets

US 7,888,923 B2

DYNAMIC PHASE MANAGER FOR MULTI-PHASE SWITCHING REGULATORS

CROSS-REFERENCE TO RELATED APPLICATIONS

This application is related to U.S. patent application Ser. No. 11/964,410, entitled "CURRENT BALANCING FOR MULTI-PHASE CONVERTERS," filed on Dec. 26, 2007, which is hereby incorporated by reference for all purposes.

TECHNICAL FIELD

The invention relates generally to multi-phase regulators and, more particularly, to controllers for multi-phase DC-to-DC converters.

BACKGROUND

Multi-phase DC-DC converters are commonly used to support high current applications for better thermal management while enabling use of power stage components (inductors, capacitors, switches) with lower ratings and cost. Many multi-phase converters employ digital controls and allow for the adding or dropping of phases through the use of an external pin. Some examples of conventional multi-phase DC-DC converters are as follows: U.S. Pat. No. 5,963,441; U.S. Pat. No. 6,965,502; U.S. Patent Pre-Grant Pub. No. 2002/0171985; and U.S. Patent Pre-Grant Pub. No. 2007/0139973.

SUMMARY

An embodiment of the invention, accordingly, provides an apparatus. The apparatus comprises a current sensor; an error amplifier that is adapted to receive a reference voltage and a feedback voltage; a comparator having a first input terminal and a second input terminal, wherein the sum of at least a first portion of a common mode voltage and an output of the error amplifier is input into the first input terminal, and wherein the sum of at least a second portion of the common mode voltage and an output of the current sensor is input into the second input terminal; an analog-to-digital converter (ADC) that receives the sum of the second portion of the common mode voltage and the output of the current sensor, wherein the ADC has a plurality of internal threshold voltage that are between the common mode voltage and an overcurrent limit adjustment voltage; control logic that receives an output from the comparator and the ADC; and a plurality of drivers, wherein each driver is adapted to receive at least one control signal from the control logic, and wherein the plurality of drivers are adapted to provide drive signals to a converter's power switches, which may be external or integrated on to the same IC monolithically or in the same package as a module.

In accordance with an embodiment of the invention, the current sensor further comprises a plurality of current sense amplifiers; and an adder that receives an output from each of the current sense amplifiers.

In accordance with an embodiment of the invention, the adder is a node.

In accordance with an embodiment of the invention, the ADC further comprises a voltage divider that receives the overcurrent limit adjustment voltage and that receives the common mode voltage, wherein the voltage divider produces the plurality of internal reference voltages; a plurality of ADC comparators, wherein each ADC comparator receives at least one internal reference voltage from the voltage divider, and wherein each ADC comparator receives the output from the sum of the second portion of the common mode voltage and the output of the current sensor; and a decoder that receives an output from each ADC comparator.

In accordance with an embodiment of the invention, an apparatus that provides an output voltage to a load is provided. The apparatus comprises an output node that is adapted to provide the output voltage to the load; a capacitor coupled to the output node; a plurality of phase sections, wherein each phase section is coupled to the output node; a feedback sensor that is adapted to generate a feedback voltage and at least one current sense voltage; a controller that is adapted to provide a plurality of drive signals to the phase sections. The controller includes a current sensor that receives the current sense voltage; an error amplifier that is adapted to receive a reference voltage and the feedback voltage; a comparator having a first input terminal and a second input terminal, wherein the sum of at least a first portion of a common mode voltage and an output of the error amplifier is input into the first input terminal, and wherein the sum of at least a second portion of the common mode voltage and an output of the current sensor is input into the second input terminal; an ADC that receives the sum of the second portion of the common mode voltage and the output of the current senor, wherein the ADC has a plurality of internal threshold voltage that are between the common mode voltage and an overcurrent limit adjustment voltage; control logic that receives an output from the comparator and the ADC; and a plurality of drivers, wherein each driver is adapted to receive at least one control signal from the control logic, and wherein the plurality of drivers are adapted to provide the plurality of drive signals.

In accordance with an embodiment of the invention, each phase section is a boost section.

In accordance with an embodiment of the invention, each boost section further comprises an inductor that receives an input voltage; a transistor coupled to the inductor, wherein the transistor is coupled at its control electrode to the controller; and a diode coupled to the inductor and coupled to the transistor.

In accordance with an embodiment of the invention, each phase section is a buck section.

In accordance with an embodiment of the invention, each buck section further comprises a bridge that receives an input voltage and that is coupled to the controller; and an inductor that is coupled to the bridge.

In accordance with an embodiment of the invention, each bridge further comprises a first FET that receives the input voltage at its drain and is coupled to the controller at its gate; and a second FET that is coupled at its drain to the source of the first FET, that is coupled at its gate to the controller, and that is coupled to ground at its source.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
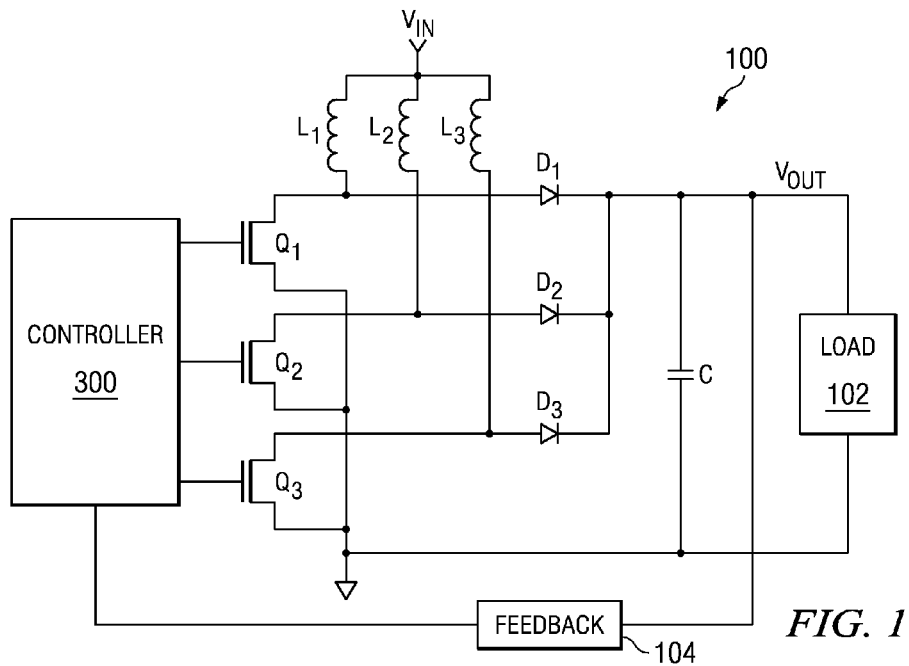
FIG. 1 is a three-phase boost converter employing a controller in accordance with an embodiment of the invention.

Refer now to the drawings wherein depicted elements are, for the sake of clarity, not necessarily shown to scale and wherein like or similar elements are designated by the same reference numeral through the several views.

Figure 2:
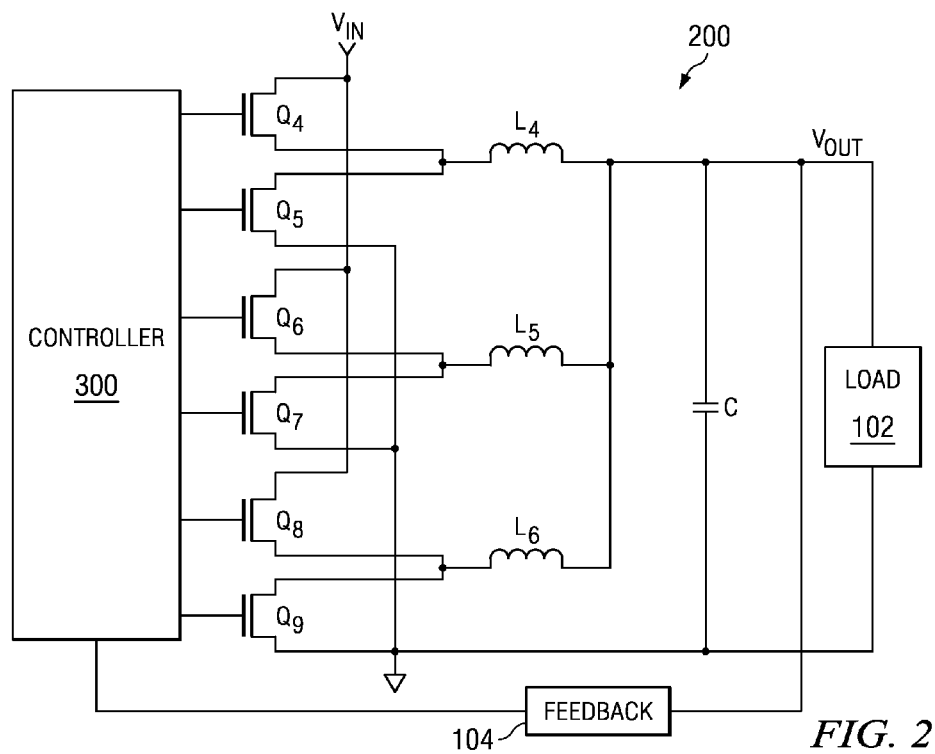
FIG. 2 is a three-phase buck converter employing a controller in accordance with an embodiment of the invention.
Figure 3:
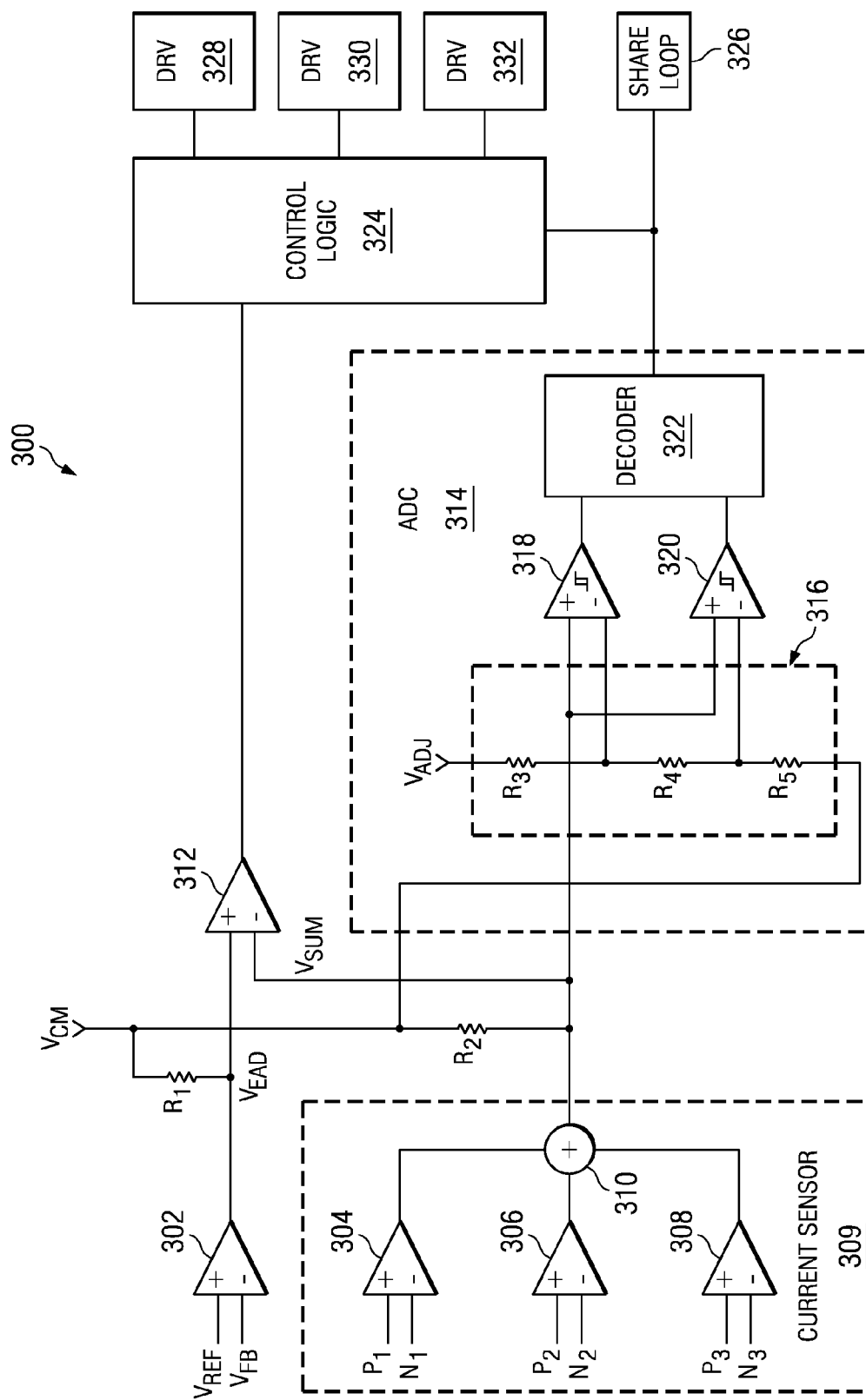
FIG. 3 is a diagram of the controller employed in FIGS. 1 and 2.

Referring to FIGS. 1 and 2 of the drawings, the reference numerals 100 and 200 generally designate a boost DC-DC converter in accordance with an embodiment of the invention and a buck DC-DC converter in accordance with an embodiment of the invention, respectively. Each of the converters 100 and 200 are preferably three-phase converters; however, any number of phases can be employed. Additionally, each of the converters 100 and 200 employ controller 300.

Turning first to converter 100, converter 100 is able to convert the input voltage $V_{IN}$ into an output voltage $V_{OUT}$ with a higher value. Preferably, the converter 100 can be divided into three phase sections. Each phase section is comprised of an inductor $L_1$, $L_2$, and $L_3$, a switch $Q_1$, $Q_2$, and $Q_3$, and a diode $D_1$, $D_2$, and $D_3$. Each of the three inductors $L_1$, $L_2$, and $L_3$ receives the input voltage $V_{IN}$ in parallel and are controlled by switches $Q_1$, $Q_2$, and $Q_3$, respectively. Preferably, each of switches $Q_1$, $Q_2$, and $Q_3$ (which are preferably NMOS FETs) receives control or drive signals from the controller 300. Each of the inductors $L_1$, $L_2$, and $L_3$ is also coupled to a $D_1$, $D_2$, and $D_3$, respectively. Each of the diodes $D_1$, $D_2$, and $D_3$ is also coupled to capacitor C so as to provide the output voltage $V_{OUT}$ to the load 102. The output voltage $V_{OUT}$ and output current can then be sensed by the feedback circuit 104 and transmitted to the controller 300. Alternatively, the diodes $D_1$, $D_2$, and $D_3$ can be replaced by switches appropriately to implement a synchronous boost converter.

Now turning to converter 200, converter 200 is able to convert the input voltage $V_{IN}$ into an output voltage $V_{OUT}$ with a lower value. Preferably, the converter 200 can be divided into three phase sections. Each phase section is comprised of an inductor $L_4$, $L_5$, and $L_6$, and a bridge $Q_4/Q_5$, $Q_6/Q_7$, and $Q_8/Q_9$. The three inductors $L_4$, $L_5$, and $L_6$ are each coupled between the switches (which are preferably NMOS FETs) of their respective bridges $Q_4/Q_5$, $Q_6/Q_7$, and $Q_8/Q_9$. Each bridge $Q_4/Q_5$, $Q_6/Q_7$, and $Q_8/Q_9$ receives the input voltage $V_{IN}$ in parallel and receives control or drive signals from the controller 300. Each of the inductors $L_1$, $L_2$, and $L_3$ is also coupled to a capacitor C so as to provide the output voltage $V_{OUT}$ to the load 102. The output voltage $V_{OUT}$ and output current can then be sensed by the feedback circuit 104 and transmitted to the controller 300.

The controller 300 in each of converts 100 and 200 operates to control switching of each of the phase sections. Controller 300 is generally comprised of an error amplifier 302, a current sensor 309, and analog-to-digital converter (ADC) or phase manager 314, resistors or impedance elements $R_1$ and $R_2$, comparator 312, control logic 324, a share loop 326, and drivers 328, 330, and 332. The current sensor 309 is generally comprised of three current sense amplifier 304, 306, and 308 (one for each phase, generally) and an adder 310 (which can simply be a node). The ADC is generally comprised of a voltage divider 316 (preferably, resistor or impedance elements $R_3$, $R_4$, and $R_5$ coupled in series with one another), ADC comparators 318 and 320, and a decoder 322.

In operation, the driving signals are generated based on feedback received from the feedback circuit 102. Preferably, the error amplifier receives the feedback voltage $V_{FB}$ (which is generally the sensed output voltage $V_{OUT}$) and compares the feedback voltage to a reference voltage $V_{REF}$. Additionally, the current sensor 309 preferably receives positive current sense signals $P_1$, $P_2$, and $P_3$ and negative current sense signals $N_1$, $N_2$, and $N_3$ the input terminals or nodes of current sense amplifiers 304, 306, and 308 (each generally corresponding to a particular phase). The current sensor 309 then sums or adds the output of the current sense amplifiers 304, 306, and 308. Each of the outputs of the error amplifier 302 and the current sensor 309 are combined with at least a portion of a common mode voltage $V_{CM}$. Preferably, the output of the error amplifier 302 is combined with the common mode voltage $V_{CM}$ that is reduced by resistor $R_1$ to generate an error voltage $V_{EAO}$, while the output of the current sensor 309 is combined with the common mode voltage $V_{CM}$ reduced by resistor $R_2$ to generate a sum voltage $V_{SUM}$. The error voltage $V_{EAO}$ and the sum voltage $V_{SUM}$ are compared by comparator or pulse-width-modulated (PWM) comparator 312, which generates a PWM signal for the control logic 324. The sum voltage $V_{SUM}$ is also generally processed by the ADC 314, which outputs a control signal to the control logic 324 and the share loop 326. Based on the PWM signal and control signal from the comparator 312 and ADC 314, the control logic 324 generates control signals for drivers 328, 330, and 332, which, in turn, drive each of the phase sections of converters 100 and 200. Additionally, share loop 326 is generally employed to share or distribute over time the current load over the different phases.

To dynamically adjust the converter, the ADC 314 is employed to do so. Preferably, the ADC 314 automatically adds or drops phases depending on the load current (based on either total current or the output of the error amplifier 302). To accomplish this, the ADC uses per-phase over-current limit information to adjust internal threshold voltages for transitioning between the number of phase (which also generally eliminates the need for external pin programming). Preferably, the internal threshold voltages are generated from the voltage divider 316. These internal threshold voltages are between an overcurrent limit adjustment voltage $V_{ADJ}$ and the common mode voltage $V_{CM}$. The adjustment voltage $V_{ADJ}$ is generally increased or decreased based on an overcurrent limit that is set by an external pin, which allows the internal threshold voltages to be shifted. These internal threshold voltages are input into ADC comparators 318 and 320 (which each have an internal hysteresis to enable the transition between phases to be generally seamless) so that they can be compared to the sum voltage $V_{SUM}$. The outputs of the comparators 318 and 320 can then be decoded by the decoder 322 to generate the control signals for the control logic 322 and share loop 326.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a current sensor;
    an error amplifier that is adapted to receive a reference voltage and a feedback voltage;
    a comparator having a first input terminal and a second input terminal, wherein the sum of at least a first portion of a common mode voltage and an output of the error amplifier is input into the first input terminal, and wherein the sum of at least a second portion of the common mode voltage and an output of the current sensor is input into the second input terminal;
    an analog-to-digital converter (ADC) that receives the sum of the second portion of the common mode voltage and the output of the current senor, wherein the ADC has a plurality of internal threshold voltage that are between the common mode voltage and an overcurrent limit adjustment voltage;
    control logic that receives an output from the comparator and the ADC; and
    a plurality of drivers, wherein each driver is adapted to receive at least one control signal from the control logic, and wherein the plurality of drivers are adapted to provide drive signals to a converter.

2. The apparatus of claim 1, wherein the current sensor further comprises:
    a plurality of current sense amplifiers; and
    an adder that receives an output from each of the current sense amplifiers.

3. The apparatus of claim 2, wherein the adder is a node.

4. The apparatus of claim 1, wherein the ADC further comprises:
    a voltage divider that receives the overcurrent limit adjustment voltage and that receives the common mode voltage, wherein the voltage divider produces the plurality of internal reference voltages;
    a plurality of ADC comparators, wherein each ADC comparator receives at least one internal reference voltage from the voltage divider, and wherein each ADC comparator receives the output from the sum of the second portion of the common mode voltage and the output of the current sensor; and
    a decoder that receives an output from each ADC comparator.

5. An apparatus that provides an output voltage to a load, the apparatus comprising:
    an output node that is adapted to provide the output voltage to the load;
    a capacitor coupled to the output node;
    a plurality of phase sections, wherein each phase section is coupled to the output node;
    a feedback sensor that is adapted to generate a feedback voltage and at least one current sense voltage;
    a controller that is adapted to provide a plurality of drive signals to the phase sections, wherein the controller includes:
        a current sensor that receives the current sense voltage;
        an error amplifier that is adapted to receive a reference voltage and the feedback voltage;
        a comparator having a first input terminal and a second input terminal, wherein the sum of at least a first portion of a common mode voltage and an output of the error amplifier is input into the first input terminal, and wherein the sum of at least a second portion of the common mode voltage and an output of the current sensor is input into the second input terminal;
        an ADC that receives the sum of the second portion of the common mode voltage and the output of the current senor, wherein the ADC has a plurality of internal threshold voltage that are between the common mode voltage and an overcurrent limit adjustment voltage;
        control logic that receives an output from the comparator and the ADC; and
        a plurality of drivers, wherein each driver is adapted to receive at least one control signal from the control logic, and wherein the plurality of drivers is adapted to provide the plurality of drive signals.

6. The apparatus of claim 5, wherein the current sensor further comprises:
    a plurality of current sense amplifiers; and
    an adder that receives an output from each of the current sense amplifiers.

7. The apparatus of claim 6, wherein the adder is a node.

8. The apparatus of claim 5, wherein the ADC further comprises:
    a voltage divider that receives the overcurrent limit adjustment voltage and that receives the common mode voltage, wherein the voltage divider produces the plurality of internal reference voltages;
    a plurality of ADC comparators, wherein each ADC comparator receives at least one internal reference voltage from the voltage divider, and wherein each comparator receives the output from the sum of the second portion of the common mode voltage and the output of the current sensor; and
    a decoder that receives an output from each ADC comparator.

9. The apparatus of claim 5, wherein each phase section is a boost section.

10. The apparatus of claim 9, wherein each boost section further comprises:
    an inductor that receives an input voltage;
    a transistor coupled to the inductor, wherein the transistor is coupled at its control electrode to the controller; and
    a diode coupled to the inductor and coupled to the transistor.

11. The apparatus of claim 5, wherein each phase section is a buck section.

12. The apparatus of claim 11, wherein each buck section further comprises:
    a bridge that receives an input voltage and that is coupled to the controller; and
    an inductor that is coupled to the bridge.

13. The apparatus of claim 12, wherein each bridge further comprises:
    a first FET that receives the input voltage at its drain and is coupled to the controller at its gate; and
    a second FET that is coupled at its drain to the source of the first FET, that is coupled at its gate to the controller, and that is coupled to ground at its source.

* * * * *